(12) United States Patent
Mirkovic et al.

(10) Patent No.: US 7,318,970 B2
(45) Date of Patent: *Jan. 15, 2008

(54) ARCHITECTURAL HIERARCHY OF CONTROL FOR A FUEL PROCESSOR

(75) Inventors: Vesna R. Mirkovic, Pearland, TX (US); W. Spencer Wheat, Missouri City, TX (US); Hugh N. To, Houston, TX (US); Dennis J. Benedetto, Spring, TX (US)

(73) Assignee: Texaco Inc., San Ramon, CA (US)

( * ) Notice: Subject to any disclaimer, the term of this patent is extended or adjusted under 35 U.S.C. 154(b) by 443 days.

This patent is subject to a terminal disclaimer.

(21) Appl. No.: 10/407,488

(22) Filed: Apr. 4, 2003

(65) Prior Publication Data

US 2004/0197615 A1 Oct. 7, 2004

(51) Int. Cl.
H01M 8/00 (2006.01)
H01M 8/04 (2006.01)
H01M 8/12 (2006.01)
H01M 2/00 (2006.01)
H01M 2/02 (2006.01)

(52) U.S. Cl. .................. 429/13; 429/12; 429/50; 429/22; 429/34; 700/266; 700/275; 700/271; 700/272; 700/268; 700/273; 48/61

(58) Field of Classification Search .......... 429/12, 429/50, 22, 34, 13; 700/266, 275, 271, 272, 700/268, 273; 48/61

See application file for complete search history.

(56) References Cited

U.S. PATENT DOCUMENTS

| | | | |
|---|---|---|---|
| 4,673,624 A | 6/1987 | Hockaday | |
| 5,532,573 A | 7/1996 | Brown et al. | |
| 5,731,101 A | 3/1998 | Sherif et al. | |
| 5,827,602 A | 10/1998 | Koch et al. | |
| 6,326,763 B1 | 12/2001 | King et al. | |
| 6,331,366 B1 | 12/2001 | Van Dine et al. | |
| 6,534,950 B2* | 3/2003 | LeBoe | 320/104 |
| 6,824,577 B2* | 11/2004 | Deshpande | 48/127.9 |

(Continued)

OTHER PUBLICATIONS

Suarez et al., "Synthesis and physical-chemical properties of ionic liquids based on 1-$n$-butyl-3-methylimidazolium cation," *J. Chim. Phys.* 95:1626-1639 (1998).

(Continued)

*Primary Examiner*—Brian Sines
(74) *Attorney, Agent, or Firm*—Williams Morgan & Amerson; Frank C. Turner; Melissa Patangia

(57) ABSTRACT

A control technique for use in a fuel processor is disclosed. In one aspect, a control system includes a subsystem manager controller the operation of a respective physical subsystem for each of a plurality of physical subsystems in the fuel processor. The subsystem managers take their direction from a master control manager. In a second aspect, the subsystem managers collectively form a layer operating in conjunction with a second layer capable of interfacing the subsystem managers to their respective physical subsystems, a third layer capable of interfacing the subsystem managers with the second layer. In a third aspect, master control manager manages the operation of each physical subsystem through a respective subsystem manager, directs state transitions of the subsystem managers, and routs interaction between the subsystem managers from the master control manager.

18 Claims, 7 Drawing Sheets

U.S. PATENT DOCUMENTS

| | | |
|---|---|---|
| 2002/0083646 A1 | 7/2002 | Deshpande et al. |
| 2002/0088740 A1 | 7/2002 | Krause et al. |
| 2002/0090326 A1 | 7/2002 | Deshpande |
| 2002/0090327 A1 | 7/2002 | Deshpande |
| 2002/0090328 A1 | 7/2002 | Deshpande |
| 2002/0090334 A1 | 7/2002 | Stevens et al. |
| 2002/0094310 A1 | 7/2002 | Krause et al. |
| 2002/0098129 A1 | 7/2002 | Martin et al. |
| 2002/0155329 A1 | 10/2002 | Stevens |

OTHER PUBLICATIONS

Wilkes et al., "Air and Water Stable 1-Ethyl-3-methylimidazolium Based Ionic Liquids," *J. Chem. Soc., Chem. Commun.* 965-967 (1992).

Fannin, Jr. et al., "Properties of 1,3-Dialkylimidazolium Chloride—Aluminum Chloride Ionic Liquids. 2. Phase Transitions, Densities, Electrical Conductivities, and Viscosities," *J. Phys. Chem.* 88:2614-2621 (1984).

Fuller et al., "Structure of 1-Ethyl-3-methylimidazolium Hexafluorophosphate: Model for Room Temperature Molten Salts," *J. Chem. Soc., Chem. Commun.* 299-300 (1994).

Bowlas et al., "Liquid-crystalline ionic liquids," *Chem. Commun.* 1625-1626 (1996).

Bonhôte et al., "Hydrophobic, Highly Conductive Ambient-Temperature Molten Salts," *Inorg. Chem.* 35:1168-1178 (1996).

\* cited by examiner

ARCHITECTURAL HIERARCHY OF CONTROL FOR A FUEL PROCESSOR

BACKGROUND OF THE INVENTION

1. Field of the Invention

The present invention is directed to a fuel processor, and, more particularly, to a control system for a fuel processor.

2. Description of the Related Art

Fuel cell technology is an alternative energy source for more conventional energy sources employing the combustion of fossil fuels. A fuel cell typically produces electricity, water, and heat from a fuel and oxygen. More particularly, fuel cells provide electricity from chemical oxidation-reduction reactions and possess significant advantages over other forms of power generation in terms of cleanliness and efficiency. Typically, fuel cells employ hydrogen as the fuel and oxygen as the oxidizing agent. The power generation is proportional to the consumption rate of the reactants.

A significant disadvantage which inhibits the wider use of fuel cells is the lack of a widespread hydrogen infrastructure. Hydrogen has a relatively low volumetric energy density and is more difficult to store and transport than the hydrocarbon fuels currently used in most power generation systems. One way to overcome this difficulty is the use of "fuel processors" or "reformers" to convert the hydrocarbons to a hydrogen rich gas stream which can be used as a feed for fuel cells. Hydrocarbon-based fuels, such as natural gas, LPG, gasoline, and diesel, require conversion for use as fuel for most fuel cells. Current art uses multi-step processes combining an initial conversion process with several clean-up processes. The initial process is most often steam reforming ("SR"), autothermal reforming ("ATR"), catalytic partial oxidation ("CPOX"), or non-catalytic partial oxidation ("POX"). The clean-up processes are usually comprised of a combination of desulfurization, high temperature water-gas shift, low temperature water-gas shift, selective CO oxidation, or selective CO methanation. Alternative processes include hydrogen selective membrane reactors and filters.

Thus, many types of fuels can be used, some of them hybrids with fossil fuels, but the ideal fuel is hydrogen. If the fuel is, for instance, hydrogen, then the combustion is very clean and, as a practical matter, only the water is left after the dissipation and/or consumption of the heat and the consumption of the electricity. Most readily available fuels (e.g., natural gas, propane and gasoline) and even the less common ones (e.g., methanol and ethanol) include hydrogen in their molecular structure. Some fuel cell implementations therefore employ a "fuel processor" that processes a particular fuel to produce a relatively pure hydrogen stream used to fuel the fuel cell.

Although fuel cells have been around for over a hundred years, the technology is still considered immature. The reasons for this state are many and difficult. Recent political, commercial, and environmental conditions have, however, spurred an increased interest in fuel cell technology. The increased interest has, in turn, generated a heightened pace of technological development.

However welcome the heightened pace of development may be, it presents problems of its own. Fuel cell designs, particularly those with fuel processors, are typically complex. Consider the fuel processor design illustrated in U.S. patent application Ser. No. 10/006,963, entitled "Compact Fuel Processor for Producing a Hydrogen Rich Gas," filed Dec. 5, 2001, in the name of the inventors Curtis L. Krause, et al., and published Jul. 18, 2002, (Publication No. US2002/0094310 A1). The anode tailgas oxidizer temperature in this design is a function of catalyst loading, air flow and its space velocity and oxygen to carbon ratio at given space velocities. The sheer number of factors, in itself, makes control of this temperature a difficult task. Furthermore, a change in fuel type—for example, from natural gas to hydrogen—dramatically affects all these variables. Thus, the difficult control problem is exacerbated as the fuel processor design changes.

The present invention is directed to resolving, or at least reducing, one or all of the problems mentioned above.

SUMMARY OF THE INVENTION

A control technique for use in a fuel processor is disclosed. In one aspect, a control system includes a subsystem manager controller the operation of a respective physical subsystem for each of a plurality of physical subsystems in the fuel processor. The subsystem managers take their direction from a master control manager. In a second aspect, the subsystem managers collectively form a layer operating in conjunction with a second layer capable of interfacing the subsystem managers to their respective physical subsystems, a third layer capable of interfacing the subsystem managers with the second layer. In a third aspect, master control manager manages the operation of each physical subsystem through a respective subsystem manager, directs state transitions of the subsystem managers, and routs interaction between the subsystem managers from the master control manager.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

The present invention is generally directed to method and apparatus for controlling a "fuel processor," or "reformer," i.e., an apparatus for converting hydrocarbon fuel into a hydrogen rich gas. The term "fuel processor" shall be used herein. In the embodiment illustrated herein, the method and apparatus control a compact processor for producing a hydrogen rich gas stream from a hydrocarbon fuel for use in fuel cells. However, other fuel processors may be used in alternative embodiments. Furthermore, other possible uses are contemplated for the apparatus and method described herein, including any use wherein a hydrogen rich stream is desired. The method and apparatus may also be used in embodiments not applicable to the production of gas streams. Accordingly, while the invention is described herein as being used in conjunction with a fuel cell, the scope of the invention is not limited to such use.

Figure 1:
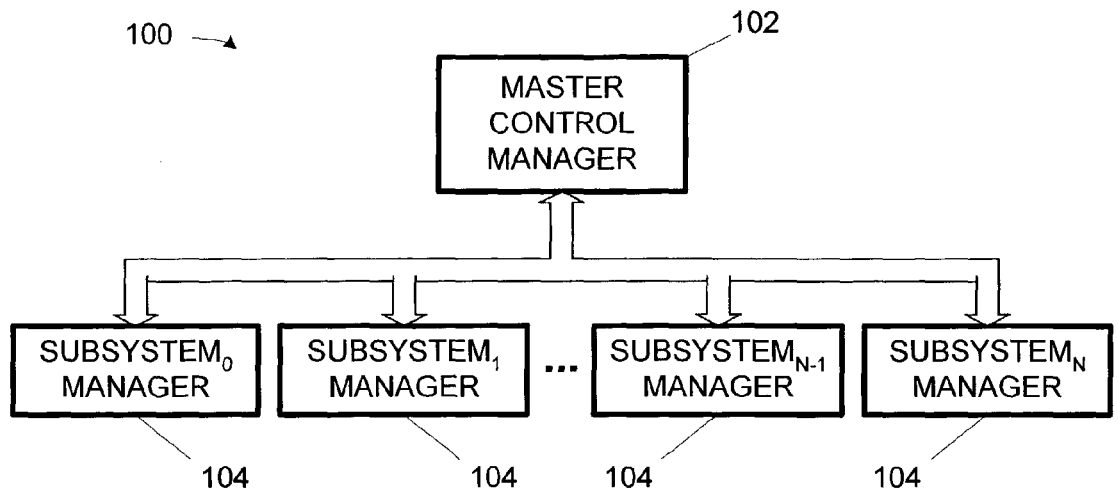
FIG. 1 illustrates one particular embodiment of a control system implemented in accordance with the present invention.

FIG. 1 illustrates one particular embodiment of a control system 100 designed, built, and operated in accordance with the present invention. The control system 100 comprises a master control manager 102, and a plurality of physical subsystem managers 104. The number of subsystem managers 104 is not material to the invention. Accordingly, FIG. 1 illustrates N subsystem managers 104, designated SUBSYSTEM MANAGER$_0$-SUBSYSTEM MANAGER$_N$. In theory, the number N may be any number, although those skilled in the art having the benefit of this disclosure will appreciate that certain practical limitations will arise from implementation specific details. Nevertheless, the number N of subsystem managers 104 is not material to the practice of the invention.

Figure 2A:
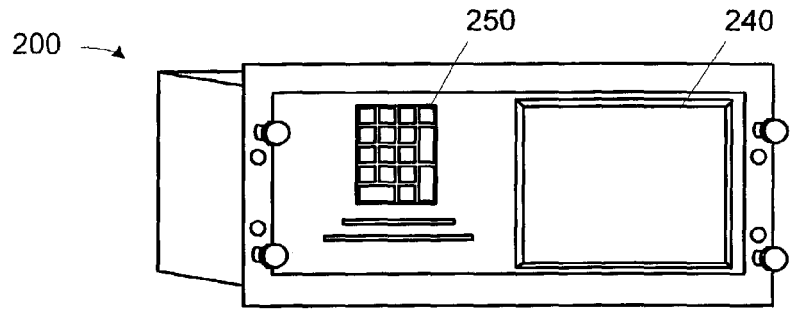
FIG. 2A and FIG. 2B conceptually illustrate a computing apparatus as may be used in the implementation of the embodiment of FIG. 1.
Figure 2B:
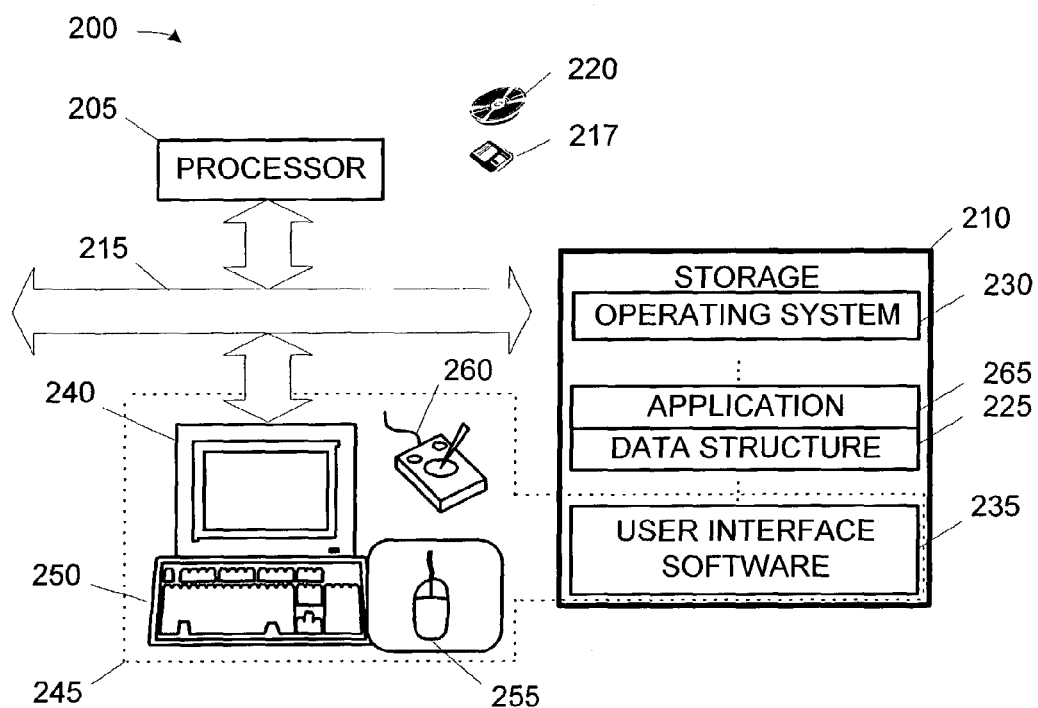

The control system 100 is largely software implemented on a computing apparatus, such as the rack-mounted computing apparatus 200 is illustrated in FIG. 2A and FIG. 2B.

Note that the computing apparatus 200 need not be rack-mounted in all embodiments. Indeed, this aspect of any given implementation is not material to the practice of the invention. The computing apparatus 200 may be implemented as a desktop personal computer, a workstation, a notebook or laptop computer, or even an embedded processor.

The computing apparatus 200 illustrated in FIG. 2A and FIG. 2B includes a processor 205 communicating with storage 210 over a bus system 215. The storage 210 may include a hard disk and/or random access memory ("RAM") and/or removable storage such as a floppy magnetic disk 217 and an optical disk 220. The storage 210 is encoded with a data structure 225 storing the data set acquired as discussed above, an operating system 230, user interface software 235, and an application 265. The user interface software 235, in conjunction with a display 240, implements a user interface 245. The user interface 245 may include peripheral I/O devices such as a key pad or keyboard 250, a mouse 255, or a joystick 260. The processor 205 runs under the control of the operating system 230, which may be practically any operating system known to the art. The application 265 is invoked by the operating system 230 upon power up, reset, or both, depending on the implementation of the operating system 230. In the illustrated embodiment, the application 265 includes the control system 100 illustrated in FIG. 1.

Thus, at least some aspects of the present invention will typically be implemented as software on an appropriately programmed computing device, e.g., the computing apparatus 200 in FIG. 2A and FIG. 2B. The instructions may be encoded on, for example, the storage 210, the floppy disk 217, and/or the optical disk 220. The present invention therefore includes, in one aspect, a computing apparatus programmed to perform the method of the invention. In another aspect, the invention includes a program storage device encoded with instructions that, when executed by a computing apparatus, perform the method of the invention.

Some portions of the detailed descriptions herein are consequently presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantifies. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Figure 3:
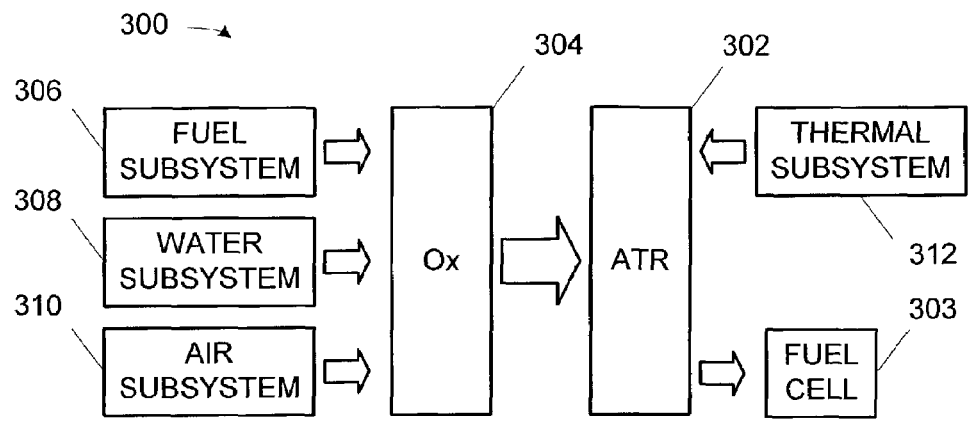
FIG. 3 illustrates one particular embodiment of a fuel processor controlled in accordance with the present invention.

The control system 100 controls, in the illustrated embodiment, a fuel processor, i.e., the fuel processor 300 in FIG. 3. The fuel processor 300 comprises several modular physical subsystems, namely:

- an autothermal reformer ("ATR") 302 that performs the oxidation-reduction reaction that reforms the fuel input to the fuel processor 300 into a reformate for a fuel cell 303;
- an oxidizer ("ox") 304, which is an anode tailgas oxidizer ("ATO") in the illustrated embodiment, that mixes steam, fuel, and air to create a fuel mixture delivered as a process feed stream to the ATR 302;
- a fuel subsystem 306, that delivers an input fuel (natural gas, in the illustrated embodiment) to the oxidizer 304 for mixing into the process feed stream delivered to the ATR 302;
- a water subsystem 308, that delivers water to the oxidizer 304 for mixing into the process feed stream delivered to the ATR 302;
- an air subsystem 310, that delivers air to the oxidizer 304 for mixing into the process feed stream delivered to the ATR 302; and
- a thermal subsystem 312, that controls temperatures in the operation of the ATR 302 by circulating a coolant (e.g., water) therethrough.

Particular implementations of the ATR 302, oxidizer 304, fuel subsystem 306, water subsystem 308, air subsystem 310, and thermal subsystem 312 are illustrated in FIG. 4A-FIG. 4F.

Figure 4A:
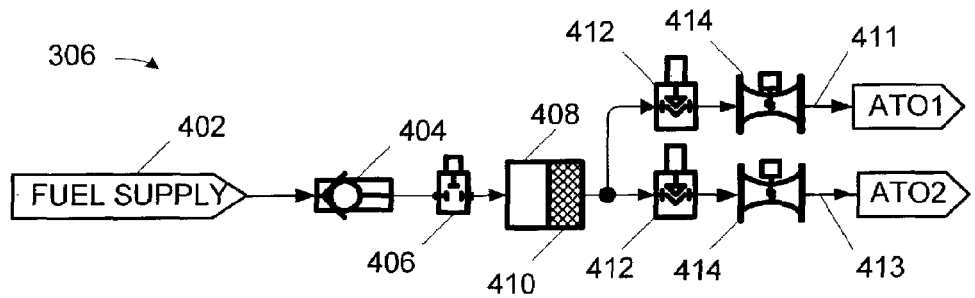
FIG. 4A-FIG. 4F detail the physical subsystems of the fuel processor in FIG. 3.

FIG. 4A depicts one particular implementation of the fuel subsystem 306. The fuel subsystem 306 includes a fuel supply 402 and provides feeds ATO1, ATO2 to two different parts of the oxidizer 304. As previously mentioned, the fuel in the illustrated embodiment is natural gas, but may be some other type of hydrocarbon. The hydrocarbon fuel may be liquid or gas at ambient conditions as long as it can be vaporized. As used herein the term "hydrocarbon" includes organic compounds having C—H bonds which are capable of producing hydrogen from a partial oxidation or steam reforming reaction. The presence of atoms other than carbon and hydrogen in the molecular structure of the compound is not excluded. Thus, suitable fuels for use in the method and apparatus disclosed herein include, but are not limited to hydrocarbon fuels such as natural gas, methane, ethane, propane, butane, naphtha, gasoline, and diesel fuel, and alcohols such as methanol, ethanol, propanol, and the like. A Sulphur trap 408 receives the fuel from the fuel supply 402 though a check valve 404 and a solenoid valve 406. The de-sulphured fuel is then filtered by the filter 410 and fed through two lines 411, 413 each including a control valve 412 and a flow meter 414, to the oxidizer 304.

Figure 4B:
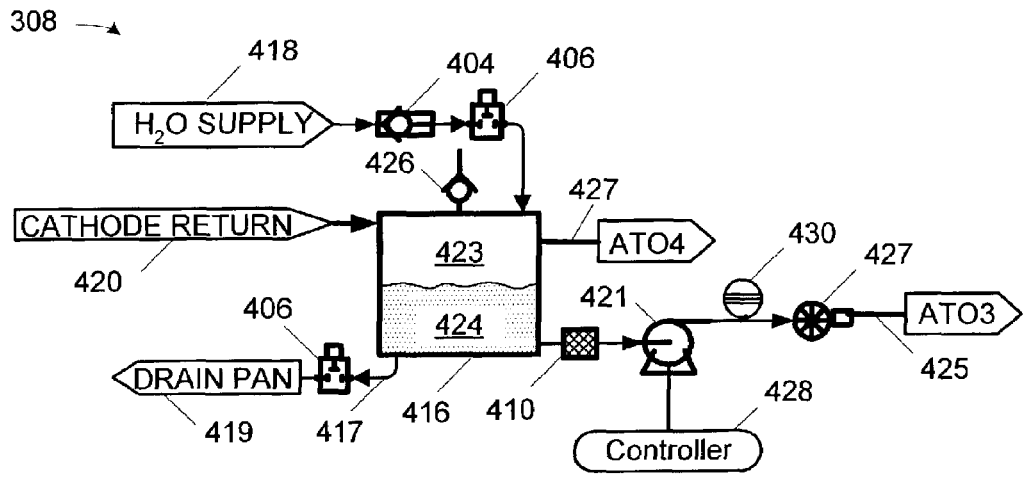

FIG. 4B depicts one particular implementation of the water subsystem 308. A tank 416 receives water from a water supply 418 through a check valve 404 and a solenoid valve 406. In the illustrated embodiment, the tank 416 also receives water through a return 420 from the cathode (not shown) of the fuel cell 303. Pressure and volume in the tank 416 are also controlled through a pressure relief, check valve 426 and a drain 417 through a solenoid valve 406 to a drain pan 419. Water 424 in the tank 416 is pumped by the pump 421 through the line 425, including the filter 410 and the mass flow meter 427, to the oxidizer 304 under the direction of the controller 428. A damper 430 damps oscillations or fluctuations in the pressure of the pumped water 424 on its way to the oxidizer 304. The air 423 is also fed to the oxidizer 304 via the line 427.

Figure 4C:
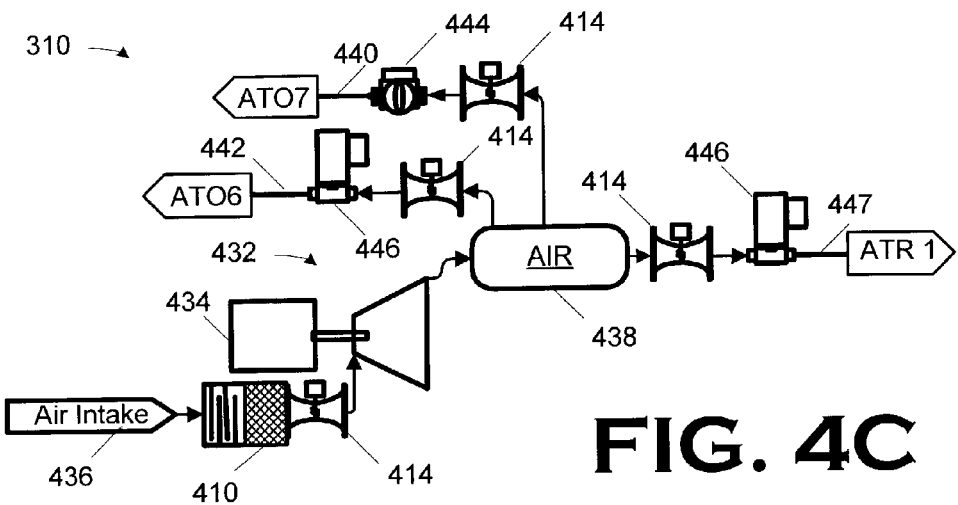

FIG. 4C depicts one particular implementation of the air subsystem 310. A compressor 432, including a motor 434, receives filtered air from the ambient atmosphere via an air intake 436, a filter 410, and a flow meter 414 and compresses it into a tank 438. The air from the tank 438 is then distributed through two feeds ATO6, ATO7 over the lines 440, 442, including the flow meters 414 and control valves 444, 446, to the oxidizer 304. The air from the tank 438 is also distributed through a feed ATR1 over the line 447 including a flow meter 414 and a control valve 446 to the ATR 302.

Figure 4D:
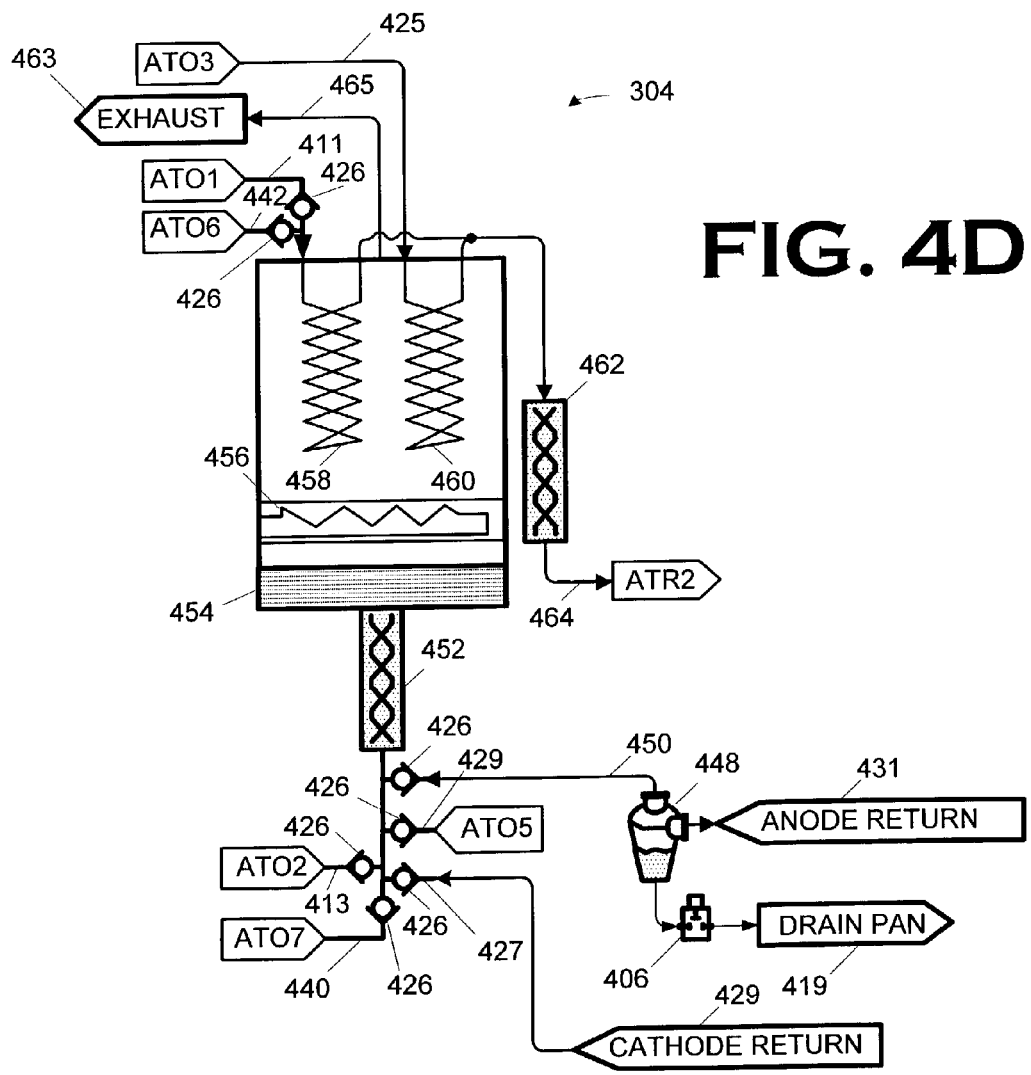

FIG. 4D depicts one particular implementation of the oxidizer 304. The oxidizer 304 receives fuel, water, and air through the feeds ATO2, ATO3, ATO5, ATO7 via the lines 413, 440, 427, 429, described above, from the fuel subsystem 306, water subsystem 308, the air subsystem 310, and the ATR 302 through a plurality of check valves 426. The feed ATO5 is from a water separation system (discussed below) associated with the ATR 302. Hot air 429 from the cathode (not show) of the fuel cell 303 is also returned to the oxidizer 304. Exhaust 431 from the anode (not shown) of the fuel cell 303 is returned to a water separator 448, that separates out the water that is drained via the solenoid valve 406 to the drain pan 419. The dehydrated anode return is then supplied to the oxidizer 304 via a check valve 426 through the line 450. The fuel, air, and dehydrated anode return are then mixed in the mixer 452, before introduction to the tank 454 of the oxidizer 304. The resultant mixture is then heated by the electric heater 456.

Still referring to FIG. 4D, the oxidizer 304 also receives fuel, air, and water from the fuel subsystem 306, the water subsystem 308, and the air subsystem 310 through the feeds ATO1, ATO6, ATO3 over the lines 411, 442, and 425, respectively, described above. The lines 411 and 442 are protected by check valves 426. Air and fuel received over the lines 411, and 442 enter the enclosed coil 458. Water received over the line 425 enters the enclosed coil 460. The heated air, water, and fuel mixture in the tank 454 heats the contents of the enclosed coils 458, 460, which are then mixed in the mixer 462 and provided to the ATR 302 through the feed ATR2 over the line 464. The oxidizer 304 is rented to an exhaust 463 through a line 465.

Figure 4E:
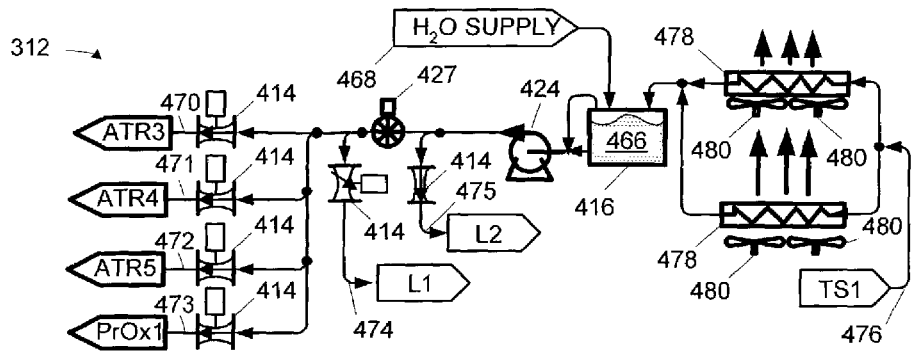

FIG. 4E depicts one particular implementation of the thermal subsystem 312. Water 466 is drawn from a water supply 468 into a tank 416. Note that the water supply 468 differs from the water supply 418 of the water subsystem 308, shown in FIG. 4B. The water 424 drawn from the water supply 418 is, in the illustrated embodiment, de-ionized, whereas the water 466 is not. The water 466 is circulated to various parts of the ATR 302 and subsystems associated with it through the feeds ATR3, PROX1, L1, L2 over the lines 471-475. Water 466 previously circulated to the ATR 302 is returned to the thermal subsystem 312 through the feed TS1 over the line 476. Heat introduced to the water 466 by the ATR 302 components is dumped to the environment through the heat exchangers 478. The illustrated embodiment also employs fans 480 to facilitate this heat exchange.

Figure 4F:
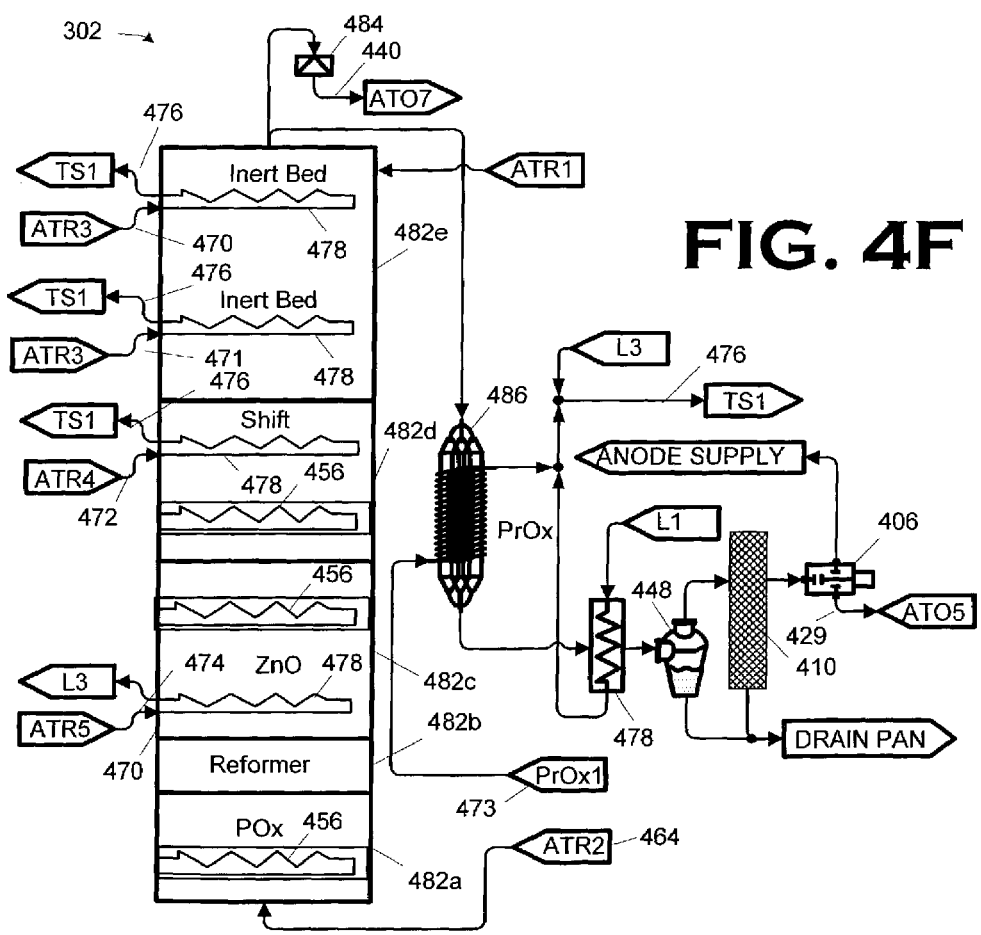

FIG. 4F depicts one particular implementation of the ATR 302. The ATR 302 comprises several stages 482a-482e, including numerous heat exchangers 478 and electric heaters 456. Each of the heat exchangers 478 receives temperature controlled water 466 from the thermal subsystem 312 (shown best in FIG. 4E) over the lines 470-472 and returns it over the lines 476. The exceptions are the heat exchangers 478 in the preferential oxidizing ("prox") stage 482, which receives the water 466 from the thermal subsystem 312 over the line 473 and returns it to a water tank 416 via line 476 and the feed TS1. The reformate gas exiting the ATR 302 passes through a preferential oxidizer 486, is heated by the heat exchanger 478, dehydrated by the water separator 448, filtered, and supplied to the anode (not shown) of the fuel cell 303 (shown in FIG. 3). The illustrated embodiment also includes a burst disk 484 that, when the ATR 302 overpressures, bursts so that the content of the ATR 302 is dumped to the oxidizer 304 via the line 440 and the feed ATO7.

Figure 5:
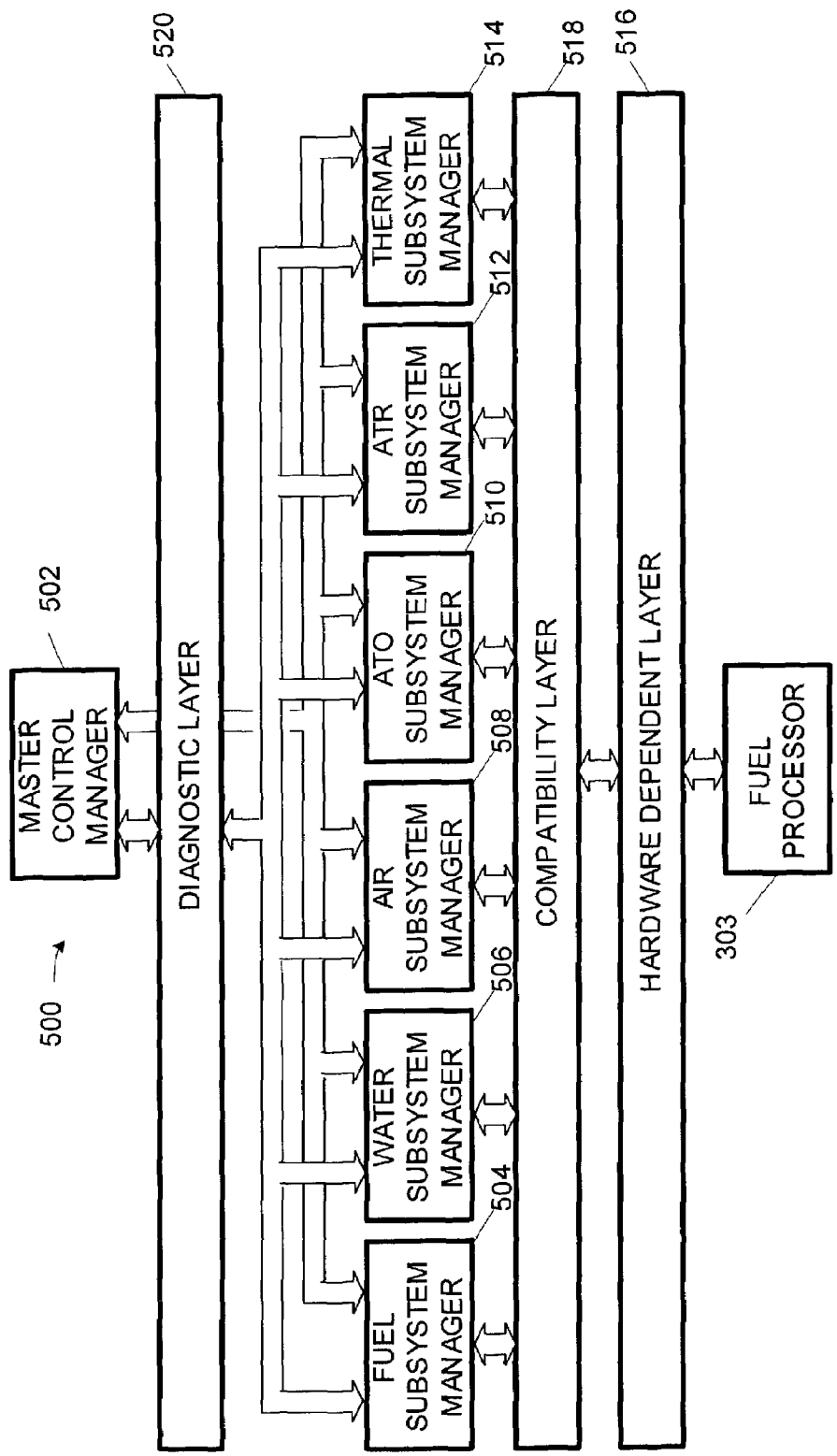
FIG. 5 depicts one particular embodiment of the control system of FIG. 1 for use in controlling the fuel processor first shown in FIG. 3.

Returning now to FIG. 3, each of the ATR 302, oxidizer 304, fuel subsystem 306, water subsystem 308, air subsystem 310, and thermal subsystem 312 constitutes a physical subsystem controlled by one of the subsystem managers 104. Thus, one particular implementation of the control system 100 for use with the particular fuel processor 300 in FIG. 3 is shown in FIG. 5 comprises:

- a master control manager 502 that manages the control of the fuel processor 300 through the subsystem managers:
  - a fuel subsystem manager 504 that controls the delivery of fuel to the ATO 306 for mixing into the process feed stream delivered to the ATR 302;
  - a water subsystem manager 506 that controls delivery of water to the ATO 306 for mixing into the process feed stream delivered to the ATR 302;
  - an air subsystem manager 508 that controls delivery of air to the ATO 306 for mixing into the process feed stream delivered to the ATR 302;
  - an ATO subsystem manager 510 that controls the mixing of steam, fuel, and air to create a fuel mixture delivered as a process feed stream to the ATR 302;
  - an ATR subsystem manager 512 that controls the oxidation-reduction reaction in the ATR 302 that reforms the fuel input to the fuel processor 300 into a reformate for the fuel cell 303; and
  - a thermal subsystem manager 514 controls temperatures in the operation of the ATR 302 through the thermal subsystem 312.

Thus, each of the subsystem managers 504-514 controls the operation of a respective physical subsystem 302, 304-312.

The control system 500 further includes additional layers that contribute to its is modularity in a hierarchical fashion. More particularly, the control system 500 includes a hardware-dependent layer 516 and a "compatibility" layer 518. Aspects of the control functionality that are hardware-dependent are segregated into the hardware-dependent layer 516. For example, referring to FIG. 4A, to increase the flow of fuel 402 to the oxidizer 304, one or both of the control valves 414 is opened. A control signal (not shown) is transmitted from the control system 500 to the actuator (also not shown) of the control valve(s) 414, and the characteristics of this signal are hardware dependent. The functionality of actually generating and transmitting this control signal is segregated into the hardware-dependent layer 516. Thus, if the hardware in, for example, the fuel subsystem 306 is changed out from one model to another, then only the hardware-dependent layer 516 needs to be amended. The compatibility layer 518 converts instructions issued by the subsystem managers 504-514 so that they are compatible with the hardware of the fuel processor 300. For instance, one subsystem manager 504-514 may request an event using a particular unit of measurement. The hardware needed to implement the request may take instructions in a second unit of measurement. The compatibility layer 518 will translate the instruction issued by the subsystem managers 504-514 in the first unit of measurement to the second unit of measurement employed by the hardware so it can be implemented by the hardware-dependent layer 516.

The illustrated embodiment of the control system 500 furthermore includes a diagnostic layer 520 that also contributes to its modularity in a hierarchical fashion. Each of the subsystem managers 504-514 monitors its respective physical subsystem 302, 304-312 for error conditions. More particularly, the subsystem managers 504-514 monitor for "shutdown" conditions, i.e., error conditions sufficiently important they warrant shutting down the fuel processor 300. The error conditions detected by the subsystem managers 504-514 are reported to the master control manager 502 through the diagnostic layer 520.

Figure 6:
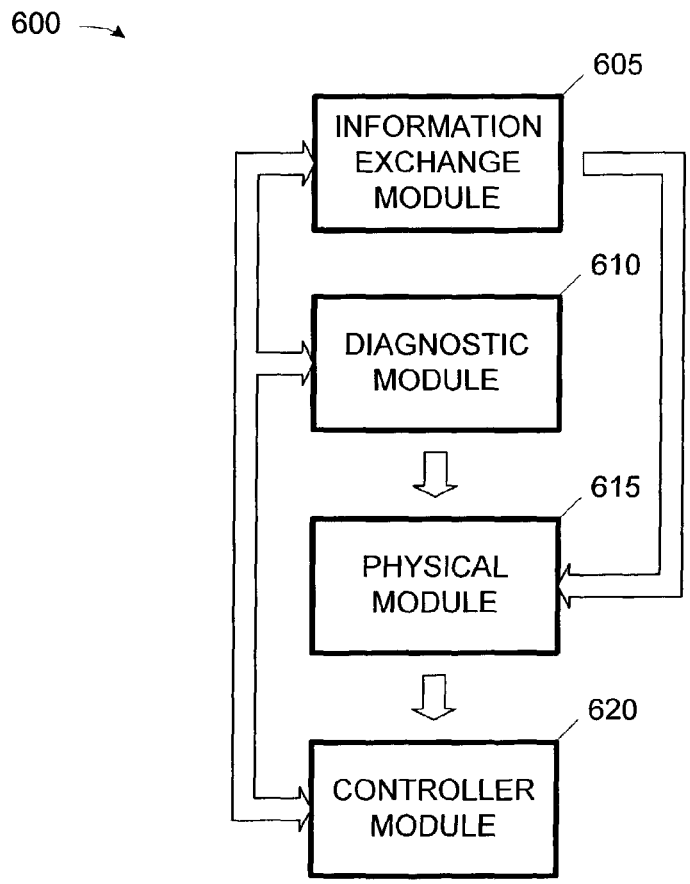
FIG. 6 illustrates an architectural hierarchy of a subsystem manager for the control system first shown in FIG. 5 in accordance with the present invention.

Each of the subsystem managers 504-514 also embodies a modular internal structure 600 conceptually illustrated in FIG. 6. Each of the subsystem managers 504-514 employs this modular internal structure 600 to conduct its business in the management of the respective physical subsystem 302, 304-312. Each of the subsystem managers 504-514 includes:

- an information exchange module 605 through which the particular subsystem manager 504-514 determines the feasibility of implementing events requested by other subsystem managers 504-514 through the master control manager 502 and identifies the actions for implementing requested events;
- a diagnostic module 610 that communicates with the diagnostic layer 520 through the information exchange module 605 to report error conditions;
- a physical module 615 with which the information exchange module 605 consults to identify the actions for implementing requested events and with which the diagnostic module communicates to obtain information regarding error conditions; and
- a control module 620 with which the physical module 615 consults to determine which actions are to be taken to implement a requested event and through which communicates with the hardware-dependent layer 516 through the compatibility layer 518 to obtain the information for such determination.

In alternative embodiments of the control system 500 omitting the diagnostic layer 520, the diagnostic module 610 may be omitted from the subsystem managers 504-514.

Returning to FIG. 5, in the illustrated embodiment, the subsystem managers 504-514 cooperate with each other by communicating requests from their information exchange modules 605 through the master control manager 502. For instance, consider a situation in which the oxidizer 304, first shown in FIG. 3, senses a drop in pressure in the feed from the fuel subsystem 306, also first shown in FIG. 3. The ATO subsystem manager 510 may request that the supply of fuel increase. In the parlance of the illustrated embodiment, a fuel increase would be an "event." The ATO subsystem manager 510 issues the request through its information exchange module 605, shown in FIG. 6, which communicates the request to the master control manager 502. The master control manager 502 forwards the request to the appropriate physical subsystem manager—the fuel subsystem manager 504, in this case.

The fuel subsystem manager 504 receives the request via its own information exchange module 605, which checks to see if it is in the proper operational state (discussed further below) to implement the request. The fuel subsystem manager 504 then implements the requested event if it is permissible and feasible. The information exchange module 605 instructs the physical module 615 to implement the requested event. The information exchange module 605 queries the controller module 620 about which actions need to be taken. The information exchange module 605 then informs the physical module 615 of those actions that need to be taken. The physical module 615 then issues such an instruction to the hardware actuator (not shown) through the hardware dependent layer 516 via the compatibility layer 518.

The master control manager 502 also controls the operational state of the overall system 300 through the subsystem managers 504-514. Consider, for instance, the state diagram 700 in FIG. 7, which represents the operational states and the transition among them of the subsystem managers 504-514. Each of the subsystem managers 504-514 transitions through eight different states, although not all eight in every operational cycle:

- an "off" state 702;
- a "manager check" state 704, in which the subsystem managers 504-514 check the operational readiness of their respective physical subsystem 302-312;
- a "manual" state 706, in which an operator can direct operation of the overall system;
- a "preheat" state 708, in which the heating elements and fluids of the overall system 300 are preheated, or pre-cooled, to their designated levels for normal operation;
- a "startup" state 710, in which the overall system 300 begins operation under start-up conditions;
- a "run" state 712, in which the overall system 300 operates under steady-state conditions;
- a "shutdown" state 714, in which the physical subsystems of the overall system shutdown their operation to a planned end of an operational cycle; and
- an "emergency shutdown" state 716, in which the physical subsystems are shut down in response to the occurrence and detection of an emergency condition in one or more of the physical subsystems.

Although each of the subsystem managers 504-514 transitions through the same eight states, the tasks assigned to each of the subsystem managers 504-514 will be unique in light of the requirements of their respective physical subsystem 302-312. For example, the tasks performed by the fuel subsystem manager 504 in the run state 712 will differ from the tasks of the ATR subsystem manager 512 in the run state, given the differences in the operation and function of the fuel subsystem 306 and the ATR 302, both shown in FIG. 3.

Returning to FIG. 7, coming out of the off state 702, the subsystem managers 504-514 may transition into either the manager check state 704 or the manual state 706. From the manual state 706, the subsystem managers 504-514 transition only to either the shutdown state 714 or the emergency shutdown state 716. From the manager check state 704, the system managers 504-514 may transition through the preheat state 708, startup state 710, and run state 712 in that order. The subsystem managers 504-514 can transition into either of the shutdown state 714 and the emergency shutdown state 716 from any of the other states.

Figure 7:
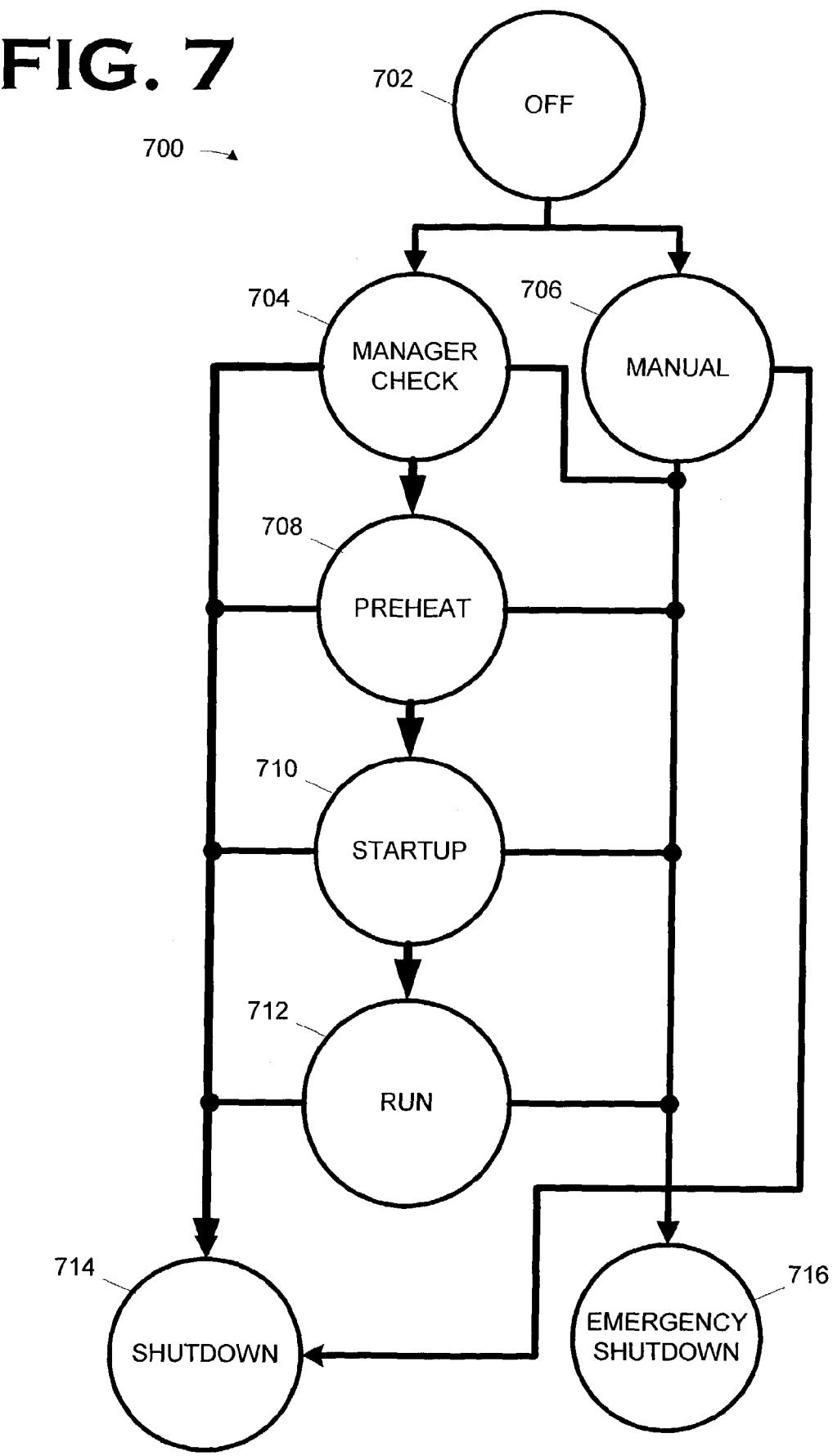
FIG. 7 is a state machine for the physical subsystems of one particular embodiment of the present invention.

Referring now to FIG. 5 and FIG. 7, an operator chooses whether to enter the manual state 706 on powering up or initializing the system, i.e., exiting the off state 702. If the operator does not choose the manual state 706, the master control manager 502 assumes control. In the manual state 706, the operator can choose a percentage of operational capacity and the system ramps up to the setpoints of the specified level, but still applies control logic. That is, the subsystem managers 504-514 still cooperate with one another through the master control manager 500 as described above.

Assuming now that the operator does not assume manual control, the master control manager 502 sends a signal to each of the subsystem managers 504-514 to transition to the manager check state 704. Each of the subsystem managers 504-514 transitions to the manager check state 704. Each of the subsystem managers 504-514 then performs its tasks associated with the manager check state 704. When the individual subsystem managers 504-514 have completed their tasks associated with the manager check state 704, they signal that fact to the master control manager 502. The master control manager 502 waits until all the subsystem managers 504-514 have signaled they are through, and the signals the subsystem managers 504-514 to transition to the preheat state 708.

This procedure is repeated as the subsystem managers 504-514 transition through the remaining states. Note that the subsystem managers 504-514 transition to the next state only when signaled to do so by the master control manager 502. Note also that the master control manager 502 only signals the subsystem managers 504-514 to transition when all of the subsystem managers 504-514 are ready to do so. Thus, the subsystem managers 504-514 transition through their states in a synchronized fashion under the direction of the master control manager 502.

Returning to FIG. 5, the master control manager 502 therefore controls the overall operation of the fuel processor 300 in two ways. First, communications between various subsystem managers are routed through the master control manager 502. Second, the master control manager 502 controls the operational states of the subsystem managers 504-514.

Referring now to FIG. 3 and FIG. 5, the operation of the fuel processor 300 under the control of the control system 500 will now be described. On power up or reset, the fuel processor 300 and the control system 500 transition from the off state 702, shown in FIG. 7, to either the manager check state 704 or the manual state 706, depending on operator input. Again assuming the operator does not assume manual control, the master control manager 502 signals the subsystem managers 504-514 to transition to the manager check state 704, in which the subsystem managers 504-514 check the operational readiness of their respective physical subsystem. Once each of the subsystem managers 504-514 signals the master control manager 502 that their respective physical subsystem has passed the manager check, the master controller 502 signals the subsystem managers 504-514 to transition to the preheat state 708, in which the heating elements and fluids of the respective physical subsystems are preheated, or pre-cooled, to their designated levels for normal operation.

Once all the subsystem managers 504-514 signal that their respective physical subsystem has completed it's preheat tasks, the master control manager 502 signals them to transition to the startup state 710, in which the overall system 300 begins operation under start-up conditions. As will be appreciated by those skilled in the art having the benefit of this disclosure, the fuel processor 300 cannot simply step into production. For instance, the oxidizer 304 cannot begin to mix process feed stream until it has fuel, water, and air to mix. Similarly, the ATR 302 cannot begin to reform the fuel until it has received sufficient process feed stream from the oxidizer 304. Thus, in the startup state 710, out-of-range pressures, volumes, etc. that do not trigger, shutdown error conditions are tolerated until the fuel processor 300 reaches steady state operations.

Once all the subsystem managers 504-514 signal that their respective physical subsystems have reached steady-state operational conditions, the master control manager 502 signals them to transition to the run state 712. In the run state 712, the overall system 300 operates under steady-state conditions. The overall function of the fuel processor 300 is to reform the fuel 402, shown in FIG. 4A, for use by the fuel cell 303. Thus, the operation of the fuel processor 300 centers around the operation of the ATR 302 and the delivery of fuel (shown in FIG. 4A), air (shown in FIG. 4C), and water (shown in FIG. 4B) to the ATR 302 from the fuel subsystem 306, water subsystem 308, and air subsystem 310.

Figure 8:
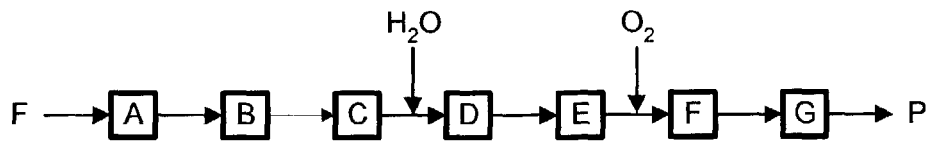
FIG. 8 graphically illustrates the reforming process of the autothermal reformer of the fuel processor first shown in FIG. 3.

FIG. 8 depicts a general process flow diagram illustrating the process steps included in the illustrative embodiments of the present invention. The following description associated with FIG. 8 is adapted from U.S. patent application Ser. No. 10/006,963, entitled "Compact Fuel Processor for Producing a Hydrogen Rich Gas," filed Dec. 5, 2001, in the name of the inventors Curtis L. Krause, et al., and published Jul. 18, 2002, (Publication No. US2002/0094310 A1). One of skill in the art should appreciate that a certain amount of progressive order is needed in the flow of the reactants trough the reactors disclosed herein. The fuel processor 300 feeds include a hydrocarbon fuel, oxygen, and water. The oxygen can be in the form of air, enriched air, or substantially pure oxygen. The water can be introduced as a liquid or vapor. The composition percentages of the feed components are determined by the desired operating conditions, as discussed below. The fuel processor effluent stream from of the present invention includes hydrogen and carbon dioxide and can also include some water, unconverted hydrocarbons, carbon monoxide, impurities (e.g., hydrogen sulfide and ammonia) and inert components (e.g., nitrogen and argon, especially if air was a component of the feed stream).

Process step A is an autothermal reforming process in which two reactions, a partial oxidation (formula I, below) and an optional steam reforming (formula II, below), performed in the modular 482a and 482b in FIG. 4F are combined to convert the feed stream F into a synthesis gas containing hydrogen and carbon monoxide. Formulas I and II are exemplary reaction formulas wherein methane is considered as the hydrocarbon:

$$CH_4 + \tfrac{1}{2}O_2 \rightarrow 2H_2 + CO \tag{I}$$

$$CH_4 + H_2O \rightarrow 3H_2 + CO \tag{II}$$

The fuel stream F is received by the ATR 302 from the oxidizer 304 over the line 434, as shown in FIG. 4D and FIG. 4F. A higher concentration of oxygen in the feed stream favors partial oxidation whereas a higher concentration of water vapor favors steam reforming. The ratios of oxygen to hydrocarbon and water to hydrocarbon are therefore characterizing parameters that affect the operating temperature and hydrogen yield.

The operating temperature of the autothermal reforming step A can range from about 550° C. to about 900° C., depending on the feed conditions and the catalyst. The ratios, temperatures, and feed conditions are all examples of parameters controlled by the control system of the present invention. The illustrated embodiment uses a catalyst bed of a partial oxidation catalyst in module 482a with or without a steam reforming catalyst.

Returning to FIG. 8, process step B is a cooling step performed in the module 482c of FIG. 4F for cooling the synthesis gas stream from process step A to a temperature of from about 200° C. to about 600° C., preferably from about 375° C. to about 425° C., to optimize the temperature of the synthesis gas effluent for the next step. This cooling may be achieved with heat sinks, heat pipes or heat exchangers depending upon the design specifications and the need to recover/recycle the heat content of the gas stream using any suitable type of coolant. The illustrated embodiment uses water 466 received from the water 466 over the line 470 as shown in FIG. 4E and FIG. 4F.

Returning again to FIG. 8, process step C is a purifying step, performed in the module 482c, and employs zinc oxide as a hydrogen sulfide absorbent. One of the main impurities of the hydrocarbon stream is sulfur, which is converted by the autothermal reforming step A to hydrogen sulfide. The processing core used in process step C preferably includes zinc oxide and/or other material capable of absorbing and converting hydrogen sulfide, and may include a support (e.g., monolith, extrudate, pellet, etc.). Desulfurization is accomplished by converting the hydrogen sulfide to water in accordance with the following reaction formula III:

$$H_2S + ZnO \rightarrow H_2O + ZnS \tag{III}$$

The reaction is preferably carried out at a temperature of from about 300° C. to about 500° C., and more preferably from about 375° C. to about 425° C. This temperature is also controlled by the control system of the present invention.

Referring once more to FIG. 8, the effluent stream may then be sent to a mixing step D performed in module 482d, in which water received from the water subsystem 308 is optionally added to the gas stream. The addition of water lowers the temperature of the reactant stream as it vaporizes and supplies more water for the water gas shift reaction of process step E (discussed below). The water vapor and other effluent stream components are mixed by being passed through a processing core of inert materials such as ceramic beads or other similar materials that effectively mix and/or assist in the vaporization of the water. Alternatively, any additional water can be introduced with feed, and the mixing step can be repositioned to provide better mixing of the oxidant gas in the CO oxidation step G (discussed below). This temperature is also controlled by the control system of the present invention.

Returning to FIG. 8, process step E, performed in Module 482e is a water gas shift reaction that converts carbon monoxide to carbon dioxide in accordance with formula IV:

$$H_2O + CO \rightarrow H_2 + CO_2 \quad (IV)$$

The concentration of carbon monoxide should preferably be lowered to a level that can be tolerated by fuel cells, typically below 50 ppm. Generally, the water gas shift reaction can take place at temperatures of from 150° C. to 600° C. depending on the catalyst used. Under such conditions, most of the carbon monoxide in the gas stream is converted in this step. This temperature and concentration are more parameters controlled by the control system of the present invention.

Returning again to FIG. 8, process step F, performed in Module 482e, is a cooling step performed in the illustrated embodiment by a heat exchanger 478. The heat exchanger 478 reduces the temperature of the gas stream to produce an effluent having a temperature preferably in the range of from about 90° C. to about 150° C. Oxygen from the air subsystem 310 is also added to the process in step F over the line 498, as shown in FIG. 4C and FIG. 4F. The oxygen is consumed by the reactions of process step G described below.

Process step G, performed in module 482g, is an oxidation step wherein almost all of the remaining carbon monoxide in the effluent stream is converted to carbon dioxide. The processing is carried out in the presence of a catalyst for the oxidation of carbon monoxide. Two reactions occur in process step G: the desired oxidation of carbon monoxide (formula V) and the undesired oxidation of hydrogen (formula VI) as follows:

$$CO + \tfrac{1}{2}O_2 \rightarrow CO_2 \quad (V)$$

$$H_2 + \tfrac{1}{2}O_2 \rightarrow H_2O \quad (VI)$$

The preferential oxidation of carbon monoxide is favored by low temperatures. Since both reactions produce heat it may be advantageous to optionally include a cooling element such as a cooling coil disposed within the process. The operating temperature of process is preferably kept in the range of from about 90° C. to about 150° C. Process step G reduces the carbon monoxide level to preferably less than 50 ppm, which is a suitable level for use in fuel cells.

The effluent exiting the fuel processor is a hydrogen rich gas containing carbon dioxide and other constituents which may be present such as water, inert components (e.g., nitrogen, argon), residual hydrocarbon, etc. Product gas may be used as the feed for a fuel cell or for other applications where a hydrogen rich feed stream is desired. Optionally, product gas may be sent on to further processing, for example, to remove the carbon dioxide, water or other components.

Eventually, the operational cycle ends. If the end is planned, then the master control manager 502 signals the subsystem managers 504-514 to transition to the shutdown state 714 at an appropriate time. As mentioned above, the subsystem managers 504-514 monitor, through their diagnostic module 610, shown in FIG. 6, their respective physical subsystems for the occurrence of error conditions. Some error conditions warrant shutting down operation of the fuel processor 300. If such a "shutdown" error condition is detected, the subsystem manager 504-514 detecting it reports it through the diagnostic module 610 and the diagnostic layer 520, shown in FIG. 5, to the master control manager 502. The master control module 502 then signals the subsystem managers 504-514 to transition to the emergency shutdown state 716.

The modular design resulting from the hierarchical nature of the present invention permits flexibility in expansion of the control system. Whole subsystems can be removed, added, and/or replaced for testing, evaluating, and modifying subsystem designs without having to make major adjustments to the control system. None of the control algorithms are hardware-dependent, except for the hardware dependent layer, which contains instrument calibration data. Thus, various types of instruments can be added, removed, or replaced without affecting the control system as a whole, and without requiring a lot of reprogramming. The present invention therefore allows rapid and easy expansion of the process control system and facilitates seamless plug-ins of new subsystems. It also permits independent or different teams of developers to quickly create the control software for various physical subsystems from a relatively simple specification. This asset is particularly useful in rapidly evolving technologies, such as fuel processor/fuel cell design, with complex control systems.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:
1. A method for controlling a fuel processor comprising a plurality of physical subsystems, the method comprising:
managing the operation of each physical subsystem through a respective subsystem manager;
directing state transitions of the subsystem managers from a master control manager; and routing interaction between the subsystem managers from the master control manager.

2. The method of claim 1, wherein managing the operation of each physical subsystem includes invoking a control module, an information exchange module, and a control module.

3. The method of claim 2 wherein managing the operation further includes invoking a diagnostics module.

4. The method of claim 1, wherein directing state transitions of the subsystem managers includes directing state transitions:
to an off state;
to at least one operational state from the off state; and
to at least one shutdown state from any of the operational states.

5. The method of claim 4, wherein the at least one operational state comprises at least one of:
a manual state into which the subsystem may transition from the off state;
a manager check state into which the subsystem may transition from the off state;
a preheat state into which the subsystem may transition from the manager check state;
a startup state into which the subsystem may transition from the preheat state; and
a run state into which the subsystem may transition from the startup state.

6. The method of claim 4, wherein the at least one shutdown state includes at least one of:
a standard shutdown state; and
an emergency shutdown state.

7. An apparatus for controlling a fuel processor comprising a plurality of physical subsystems, the apparatus comprising:
means for managing the operation of each physical subsystem through a respective subsystem manager;
means for directing state transitions of the subsystem managers from a master control manager; and
means for routing interaction between the subsystem managers from the master control manager.

8. The apparatus of claim 7, wherein the means for managing the operation of each physical subsystem includes means for invoking a control module, an information exchange module, and a control module.

9. The apparatus of claim 8, wherein the means for managing the operation further includes means for invoking a diagnostics module.

10. The apparatus of claim 7, wherein the means for directing state transitions of the subsystem managers includes means for directing state transitions:
to an off state;
to at least one operational state from the off state; and
to at least one shutdown state from any of the operational states.

11. The apparatus of claim 10, wherein the at least one operational state comprises at least one of:
a manual state into which the subsystem may transition from the off state;
a manager check state into which the subsystem may transition from the off state;
a preheat state into which the subsystem may transition from the manager check state;
a startup state into which the subsystem may transition from the preheat state; and
a run state into which the subsystem may transition from the startup state.

12. The apparatus of claim 10, wherein the at least one shutdown state includes at least one of:
a standard shutdown state; and
an emergency shutdown state.

13. A program storage medium encoded with instructions that, when executed by a computer, performs a method for controlling a fuel processor comprising a plurality of physical subsystems, the method comprising:
managing the operation of each physical subsystem through a respective subsystem manager;
directing state transitions of the subsystem managers from a master control manager; and
routing interaction between the subsystem managers from the master control manager.

14. The program storage medium of claim 13, wherein managing the operation of each physical subsystem in the encoded method includes invoking a control module, an information exchange module, and a control module.

15. The program storage medium of claim 13, wherein directing state transitions of the subsystem managers in the encoded method includes directing state transitions:
to an off stats;
to at least one operational state from the off state; and
to at least one shutdown state from any of the operational states.

16. A computer programmed to perform a method for controlling a fuel processor comprising a plurality of physical subsystems, the method comprising:
managing the operation of each physical subsystem through a respective subsystem manager;
directing state transitions of the subsystem managers from a master control manager; and
routing interaction between the subsystem managers from the master control manager.

17. The programmed computer of claim 16, wherein managing the operation of each physical subsystem in the programmed method includes invoking a control module, an information exchange module, and a control module.

18. The programmed computer of claim 16, wherein directing state transitions of the subsystem managers in the programmed method includes directing stats transitions:
to an off state;
to at least one operational state from the off state; and
to at least one shutdown state from any of the operational states.

* * * * *